E. H. BRISTOL & W. E. GOODYEAR.
MEASURING OR CONTROLLING INSTRUMENT.
APPLICATION FILED APR. 18, 1908.
1,197,258.  Patented Sept. 5, 1916.
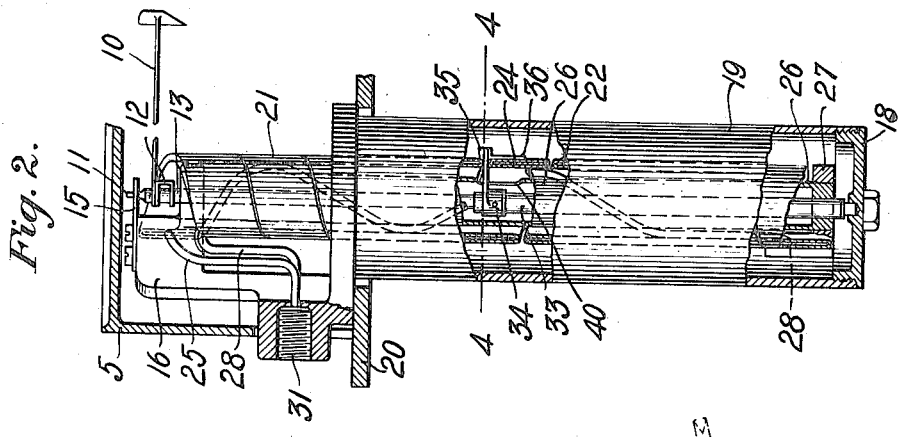
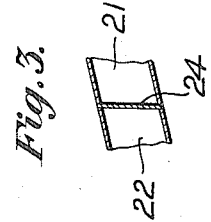
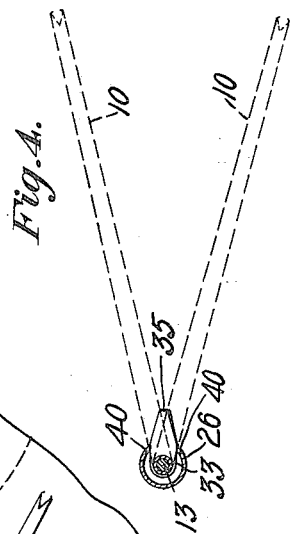
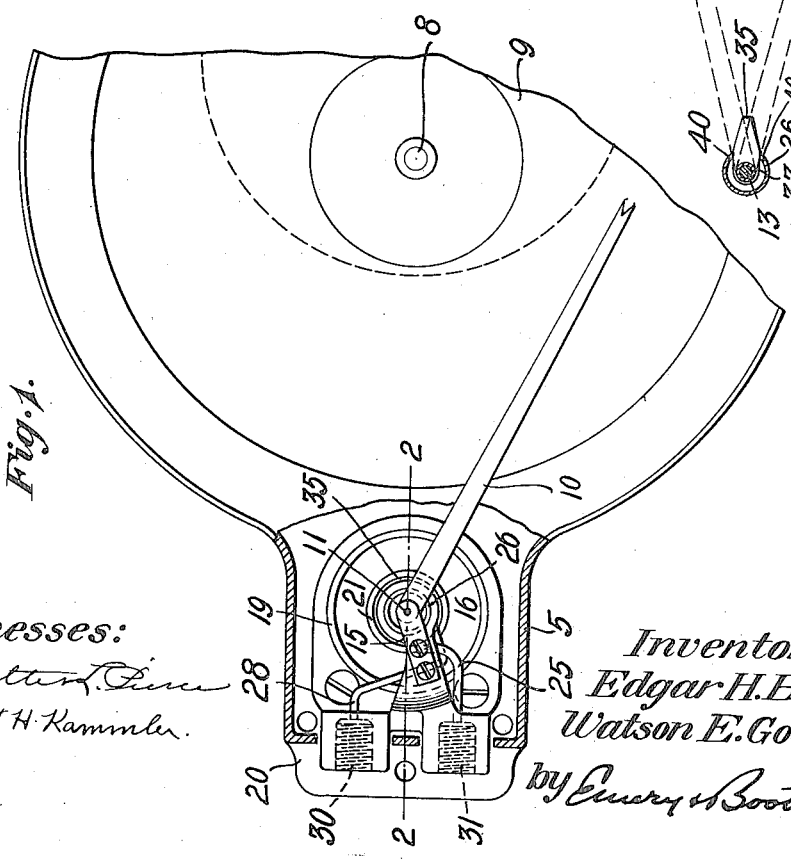
Witnesses:
Inventors:
Edgar H. Bristol,
Watson E. Goodyear,
by Emery Booth
Attys.

UNITED STATES PATENT OFFICE.

EDGAR H. BRISTOL AND WATSON E. GOODYEAR, OF NAUGATUCK, CONNECTICUT, ASSIGNORS TO THE INDUSTRIAL INSTRUMENT COMPANY, OF WATERBURY, CONNECTICUT, A CORPORATION OF CONNECTICUT.

MEASURING OR CONTROLLING INSTRUMENT.

1,197,258.     Specification of Letters Patent.     Patented Sept. 5, 1916.

Application filed April 18, 1908. Serial No. 427,784.

*To all whom it may concern:*

Be it known that we, EDGAR H. BRISTOL and WATSON E. GOODYEAR, both citizens of the United States, and residents of Naugatuck, in the county of New Haven and State of Connecticut, have invented an Improvement in Measuring or Controlling Instruments, (Case E,) of which the following description, in connection with the accompanying drawings, is a specification, like letters on the drawings representing like parts.

This invention pertains to that class of instruments wherein one or more elements responsive to changes in temperature, pressure or the like is or are utilized in performing some desired indicating, governing, actuating or other office, as exemplified in barometers and other pressure gages, thermometers, regulators and the like. As will appear to those skilled in the art the present invention is variously applicable to instruments of this class.

To illustrate one practicable mode of utilizing the features of the invention, the same will be described herein as embodied in a thermo-responsive instrument adapted in a preferred form herein described, to record temperatures upon a suitable chart.

It is to be understood of course that the invention is not limited to the specific construction and organization illustrated in the drawings; nor to the specific operation and use described herein for exemplification.

In the drawings,—Figure 1 is a face view partly in section of a differential recording thermometer embodying the features of the invention; Fig. 2 is a side elevation of a portion of the instrument shown in Fig. 1, the same being partly in section on the line 2—2 of Fig. 1; Fig. 3 is a detached detail section of the adjoining ends of two differential fluid-governed tubes; and Fig. 4 is a diagrammatic section on the line 4—4 of Fig. 2.

Referring now to the drawings the mechanism of the instrument may be mounted in a suitable case 5, having therein a time train such as a clock movement (not shown) arranged to drive a spindle 8.

A circular dial 9, graduated as desired, may be mounted upon and driven by the spindle 8 in any practicable manner, so that a unit of angular movement thereof may serve graphically to represent a period of time. An index or pointer, in the illustrated instance a pen index 10 pivoted at 11, may be arranged to travel in a generally radial direction over the chart 9, in order to indicate or record thereon a temperature, or pressure or a differential, prevailing at or during any instant or period of time.

The preceding detailed description refers to elements already well-known in the art; and these may be replaced by any desired equivalents or substituted devices. The pen index 10 serves merely to exemplify any practicable working device which may suit the purpose for which a particular instrument is intended, whether for recording or merely indicating, or for regulating, governing or actuating some collateral instrument or apparatus.

The illustrative working device or index 10, is mounted and preferably secured (as by soldering) to a yoke 12, shown in Fig. 2, the arms of which are apertured, permitting it to be seated upon a shaft 13 and fixed thereto as by soldering. In this manner the working device 10 is mounted to swing with said shaft. The latter at its upper end is journaled by a reduced portion 11 in an extension bracket 15 projecting from a casting 16, suitably secured within the casing 5. At its other extremity the shaft 13 is stepped or otherwise journaled in a cap piece 18 of a barrel 19 projecting through the bottom 20 of the casing 5. In this manner the shaft may be securely journaled so as to provide a fixed axis for the movement of the working device or index 10.

The responsive elements of the instrument, to govern the working device 10, are exemplified in the drawings by a pair of helical tubes 21, 22 preferably both arranged to influence the working device so that the latter may be governed by their conjoint operation—whether opposed or cumulative. The specific illustrative tubes may be formed from a single long tube by closing its bore at a point intermediate its ends, as by severing the long tube at its middle, sealing the severed ends, and then soldering them together again to leave a separating wall 24 between the two tubes shown in Fig. 3.

The responsive element may be mounted in any manner suitable to the purposes of the particular instrument for which it is intended. For instance, the tube 21, at its upper end may be fixed as shown to the casting 16, a duct 25 communicating with the interior of said tube. Also fixed upon the casting 16 and projecting downwardly through the helix of the tubes 21 and 22 is a hollow cylindrical strut 26 having fixed at its lower end a bracket 27. Thus the latter is supported stationarily from the casting 16. The lower end of the tube 22 may be fixed to bracket 27; and communicating therewith is a duct 28, which may be conveniently extended from the upper part of the apparatus downwardly through the helix of the tubes 21 and 22 to appropriate position proximate the bracket 27. The respective ducts 25 and 28 preferably communicate with separate plug seats 30 and 31 internally threaded to receive terminal plugs of thermometer bulbs (not shown) or other sources of pressure or fluid influence to be transmitted to the respective tubes 21 and 22. Preferably the connections are made by hermetically sealed joints.

The entire system from each thermometer bulb through its appropriate tube 21 or 22 is preferably completely filled with a fluid, as, for example, nitrogen under pressure. Thus an increase in temperature at either bulb, producing a corresponding voluminal expansion of contained fluid, tends to unwind the appropriate tube, thereby tending to cause a rotary movement of the blind end of the tube around the axis of its helix. Conversely, a decrease in temperature with a voluminal contraction of the contained fluid, tends to cause rotary movement of the tube end in a reverse direction. So long, however, (in the illustrative organization) as the temperatures of the two bulbs remain equal whether they change or not,—the fluid volumes in the two systems remaining also equal—the rotary tendency of each tube 21 and 22 may be opposed and compensated by a corresponding equal and opposite tendency of the other tube; and their adjoining ends will remain stationary. When the temperature of one bulb is different from that of the other,— the volumes of the fluid systems being correspondingly differentiated—one of the tubes 21 and 22 may have a greater rotary tendency than the other, the tubes no longer balancing and compensating, whereupon their adjoining ends may be moved to an extent commensurate with the differential between the two governing fluid volumes.

The shaft 13 may be connected to the tubes, preferably proximate their adjoining blind ends, so that the shaft shall be caused to partake of the movement of the tubes resulting from the differential of their rotary tendencies. This may be done conveniently by means of a sleeve 33, having fixed thereto a collar 34, provided with a radially projecting tongue 35, which may be soldered to adjoining parts of the tubes 21 and 22 or to one of the tubes preferably proximate their juncture. A reinforcing strip 36 may be soldered to the side of one or both the tubes and the tongue 35 secured thereto, this construction affording the latter a secure attachment.

The shaft 13 extends through the sleeve 33, and both may project downwardly below the bracket 27. In assembling the apparatus the shaft 13 and sleeve 33 are preferably only loosely associated, one within the other. Thereupon at a time when the rotary tendencies of the tubes 21 and 22 are known to be equal (as by having them subjected both to atmospheric pressure) the shaft 13 may be turned until the working device or index 10 stands in its zero or minimum indicating position, or in any desired position appropriate to the balancing of the two fluid systems. When this adjustment has been made, the sleeve 33 and shaft 13 may be rigidly secured together to rotate as one; and this may be effected conveniently by soldering them at their lower ends where they project together below the bracket 27.

The above described organization may be varied in many particulars. For instance, it is convenient in manufacture, and also otherwise desirable, that the tubes 21 and 22 be directly joined one to the other, but this is not indispensable.

In using such an instrument as has been described it may sometimes occur that excessive pressure is present in one of the tubes 21 and 22 over and above that in the other. In such a case the differential might exceed any which would be desired to be indicated or otherwise utilized. This abnormal differential, if it be permitted its full effect in moving the tubes 21 and 22, may rotate the latter so extensively as to cause one or the other or both to "set" in such manner that they might be permanently distorted from their normal position or condition. This difficulty would arise only if the tubes were permitted excessive movement; and would not result from mere increase of pressure to an abnormal degree, (within limits, of course) provided the movement of the tubes be suitably restrained.

It is preferred therefore to supply stops or other restraining means to resist movement of the tubes or other responsive elements beyond those limits within which it is desired to utilize said movement. Such restraining means is exemplified by the lateral extremities of a slot 40 (Fig. 4) in the cylindrical strut 26, through which projects the tongue 35.

It will be remembered that the specific strut 26 is fixed rigidly at its upper end to the stationary casting 16. Accordingly, the extremities of the slot 40 may be stationary. Also the tongue 35 is rigidly associated with both tubes. Therefore, movement of the tongue 35, and hence movement of the tubes, is limited by the former abutting against one or the other of the extremities of the slot 40. This is illustrated diagrammatically in Fig. 4, in which the dotted lines indicate the extremes of movement permitted to the working device 10 as exemplified in the specific instrument.

A construction embodying such devices as are shown in the drawings may be employed in diverse ways; and if a plurality of responsive elements (exemplified by the tubes 21 and 22) are employed they may have any desired functiontional relation. For example, one responsive element may have an ascertained inertia or rotary tendency (as by having a tube 22 maintained under a predetermined pressure), such as to hold the instrument at a stop limit or in a desired position, until the rotary tendency of the other element, as the tube 21, reaches an over-balancing point establishing a differential which, measured or indicated on an appropriate scale, may show the response of the tube 21 in absolute terms, instead of as a differential. This arrangement is of utility when it is desired, e. g., that the instrument respond to changes in fluid condition above a certain minimum—as to measure those pressures or temperatures only which exceed a certain degree. Also, a plurality of responsive elements may be so related functionally that one shall exert a correctional or compensating influence upon the other as will be understood by those skilled in the art. Structurally, the apparatus of the drawings may be variously changed or modified, as to suit different purposes.

Although a thermo-responsive instrument has been described herein for illustration, the invention is not limited thereto. On the contrary, a construction embodying the invention may be used for any purpose to which it may be practicably applied. It is not necessary that all the features of the invention be employed conjointly since they may be used separately, to advantage.

Claims:

1. An instrument of the character described comprising, in combination, a plurality of coaxially disposed helical tubes wound in cylindrical form and having rigidly secured ends and having their other ends stationary; a working device to be operated by said tubes; a shaft to govern said working device; supports for said shaft to journal the same at separated points and hold it securely in desired axial position; and transmitting means intermediate the connected ends of said tubes and said shaft to communicate movement of the former to the latter.

2. An instrument of the character described comprising, in combination, a plurality of helical tubes having rigidly secured ends and having their other ends stationary; a working device; and means joining the connected ends of the tubes with the working device, whereby the latter is governed by the conjoint operation of said tubes.

3. An instrument of the character described comprising, in combination, a pair of helical tubes each having a blind end rigidly secured to a blind end of the other; means to hold the other ends of the tubes stationary; a shaft mounted within the helix of one tube; means to journal the shaft rigidly in axial position; a working device governed by said shaft; and a rigid connection between the shaft and the connected blind ends of said tubes, whereby conjoint operation of said tubes rotates said shaft and governs the working device.

4. An instrument of the character described comprising, in combination, a pair of coaxially disposed cylindrical helical tubes wound in the same direction placed end to end and having connected blind ends; means to hold the other ends of said tubes stationary; a working device to be governed by conjoint operation of said tubes; and transmitting means intermediate said tubes and the working device.

5. An instrument of the character described comprising, in combination, a plurality of cylindrical helical tubes placed end to end having their adjacent ends connected, said tubes being arranged about the same helical axis; a working device to be governed by said tubes and a shaft substantially along said helical axis and connected to said tubes and the working device.

6. An instrument of the character described comprising, in combination, a plurality of helical tubes having connected ends; a working device governed by said tubes; a shaft to operate the working device; journal bearings for the shaft at separated parts thereof; and means to join the tubes with the shaft at a point intermediate the journal bearings.

7. An instrument of the character described comprising, in combination, a working device; a plurality of responsive elements to govern the same comprising a fluid-governed cylindrical helical tube, and a second cylindrical helical member arranged to restrain operation of the fluid-governed member until the latter attains an operative tendency desired to be utilized.

8. An instrument of the character described comprising, in combination, a plurality of cylindrical helical tubes having connected ends and placed end to end; a working device governed thereby; and means acted upon by adjoining ends of said tubes to operate the working device.

9. An instrument of the character described comprising, in combination, a plurality of cylindrical helical tubes axially alined and connected end to end; means to hold the remote ends of the tubes stationary; a working device; and transmitting means intermediate the working device and the connected ends of said tubes.

10. An instrument of the character described comprising, in combination, a pair of cylindrical helical tubes in axial alinement and connected end to end; a shaft projecting into the helix; separated journal bearings for the shaft; means rigidly connecting the shaft with said tubes; and a working device governed by the shaft.

11. An instrument of the character described comprising, in combination, a fluid-governed member; a working device; a shaft connected to the working device; and a sleeve fitted onto the shaft and connected to the fluid-governed member; and means for rigidly attaching the sleeve to the shaft.

12. An instrument of the character described comprising, in combination, a rotative responsive member having responsive movements in substantially opposite directions from a normal position; a rotative working device governed by the responsive movements of said member; and stop means to limit the response of said member in both said directions to a range of movement less than the capacity of the rotative movement of said members.

13. An instrument of the character described comprising, in combination, a pair of helical responsive members formed of a tube having its bore closed at a point intermediate its extremities; means to hold the extremities of the tube stationary; a working device and means connecting the working device and said responsive members at the point of closure of the bore.

14. An instrument of the character described comprising, in combination, a pair of responsive members formed of a helical tube having its bore closed at a point intermediate its extremities; means to hold portions of said tube fixed; a working device; and transmitting means intermediate the working device and a portion of said tube proximate the closed point of its bore.

15. An instrument of the character described comprising, in combination, a pair of responsive members having separate inlets and formed of a tube having its bore closed at a point intermediate its extremities; means to hold said extremities stationary; a working device; and transmitting means between the working device and a movable part of said tube.

16. An instrument of the character described comprising, in combination, a pair of responsive members formed from a helical tube having its bore closed at a point intermediate its extremities; a shaft extending through the helix of the tube; means connecting the shaft to the tube; and a working device governed by the shaft.

17. In an instrument of the class described, the combination of a working device mounted to swing or oscillate, with a plurality of differentially acting helical responsive members placed end to end having a rotative responsive movement conjointly to govern the same.

18. In an instrument of the class described, the combination of a working device with a plurality of differentially acting responsive members having a rotative responsive movement collectively to govern the same, comprising each a plurality of convolutions placed end to end.

19. In an instrument of the class described, the combination of a responsive member comprising a plurality of convolutions having a rotative responsive movement; an opposing member; said members having rotary tendencies directed along substantially the same or parallel circular paths; and a working device governed by resultant operation of said members.

In testimony whereof, we have signed our names to this specification, in the presence of two subcribing witnesses.

EDGAR H. BRISTOL.
WATSON E. GOODYEAR.

Witnesses:
WILLIAM SCHULZ,
F. A. HENRY.

It is hereby certified that Letters Patent No. 1,197,258, granted September 5, 1916, upon the application of Edgar H. Bristol and Watson E. Goodyear, of Naugatuck, Connecticut, for an improvement in "Measuring or Controlling Instruments," were erroneously issued to The Industrial Instrument Company, of Waterbury, Connecticut, a corporation of Connecticut, whereas said Letters Patent should have been issued to *The Foxboro Company, of Foxboro, Massachusetts, a corporation of Massachusetts*, said corporation being assignee *by mesne assignments* of the entire interest in said invention, as shown by the records of assignments in this office; and in the printed specification, page 3, line 129, claim 8, and page 4, lines 6 and 14, claims 9 and 10, before the word "cylindrical" insert the word *substantially;* page 4, lines 83-84, claim 18, after the word "device" insert the words *mounted to swing or oscillate;* and that the said Letters Patent should be read with these corrections therein that the same may conform to the record of the case in the Patent Office.

Signed and sealed this 19th day of December, A. D., 1916.

[SEAL.]

R. F. WHITEHEAD,
*Acting Commissioner of Patents.*